Aug. 18, 1942.  E. D. MORRIS  2,293,163

WELDING

Filed June 20, 1940

INVENTOR
EDWARD D. MORRIS
BY
ATTORNEY

Patented Aug. 18, 1942

2,293,163

UNITED STATES PATENT OFFICE 2,293,163

WELDING

Edward D. Morris, Chicago, Ill., assignor to The Linde Air Products Company, a corporation of Ohio Application June 20, 1940, Serial No. 341,426

8 Claims. (Cl. 219—10)

This invention relates to welding, and more particularly to an improved method of and apparatus for electric rivet or line welding in which the welding operation is conducted beneath a blanket of granular fusible mineral welding material.

In electric rivet or slot welding, the welding electrode is fed to a limited, substantially fixed area of the work as it is consumed and does not traverse the work to any substantial extent, remaining substantially in the same spot with respect to the work. When such electric rivet or slot welding is carried out beneath a blanket of granular welding material, the molten slag formed by fusion of the material during the welding operation tends to build up above the welding puddle around the welding electrode, causing the electrode to overheat above the actual welding zone. This impairs the control of the welding action and often results in poor fusion at the edges of the weld base. Such conditions are not encountered when line welding with automatic welding machines as the welding electrode is not only fed toward the work but is also traversed along the work, encountering a fresh supply of the granular welding material as it moves along the work, there not being a sufficient time interval for the molten slag at any particular point along the line of welding to build up around the electrode.

It is therefore among the objects of this invention to provide a method of electric rivet or line welding, in which a fusible electrode is advanced to the work through a column of granular welding material supported above the welding puddle; to provide such a method in which molten slag, formed by fusion of the welding material, is forced to flow laterally or radially away from the electrode to prevent such slag from building up around the electrode and overheating the same above the welding puddle; and to provide a simple and economically constructed welding apparatus for practicing such method. Other objects will become apparent as the description proceeds.

The principles of the invention will be understood from the following description and the accompanying drawing, in which.

Generally speaking, the objects of the invention are accomplished by advancing a fusible electrode to the work through a horizontally stationary vertical column of granular fusible mineral welding material supported above the welding puddle. The column of material is sufficiently high that the hydrostatic head created thereby will prevent the molten slag, formed by fusion of the material due to the passage of an electric current through the material from the electrode to the work, from building up around the welding electrode, which, in rivet or slot welding does not move horizontally relatively to the work to any substantial extent. The weight of the column of material is sufficient to substantially counteract or neutralize the hydrostatic head created by the tendency of the molten slag to rise up along the electrode. Thus, by the present invention, this molten slag is forced to flow laterally or radially away from the electrode. To maintain the column of material at the height requisite to create the necessary hydrostatic head, a continuous supply of material is fed to the welding region.

One form of apparatus for practicing the method of the invention desirably includes a welding material chamber for containing a sufficient amount of the welding material to furnish a substantially continuous supply of material to the welding region and maintain a horizontally stationary column of the material around the welding electrode above the welding puddle during the entire welding operation. Supporting means, preferably engaging the work, holds the welding material chamber in spaced relation to the work to provide space for the free flow of the molten slag laterally or radially away from the electrode. Guiding means for the electrode are desirably provided in the apparatus and may be formed to permit manipulation of the electrode laterally of the welding region.

Figure 1:
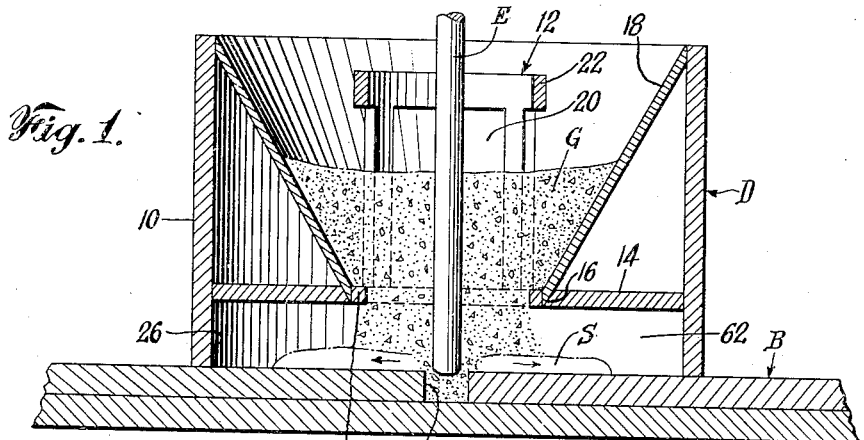
Fig. 1 is a sectional view of a rivet welding device embodying the principles of the invention.
Figure 2:
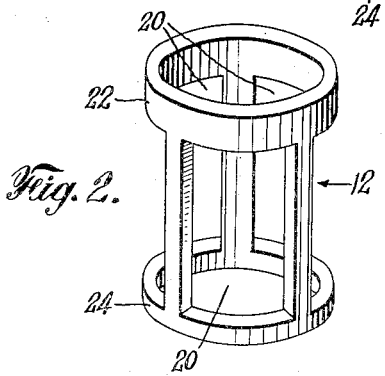
Fig. 2 is a perspective view of a portion of the device of Fig. 1.

Referring more particularly to the drawing, the apparatus illustrated in Figs. 1 and 2 comprises a feeding device D particularly adapted to the formation of rivet welds between a pair of metal plates A and B. The plate B rests on the plate A and is formed with an aperture C designed to receive molten weld metal deposited from a fusible metal electrode E arranged in operative relation to the work. In forming a rivet weld between plates A and B in the aperture C, an electric current is passed from the electrode to the work through a granular fusible mineral welding material G, preferably of the type described and claimed in U. S. Patent No. 2,043,960, issued in the names of Jones, Kennedy, and Rotermund. Fusion of this welding material forms a molten slag S which tends to build up around electrode E, causing overheating of the electrode above the welding puddle, impairing control of the welding operation and often resulting in poor fusion at the edges of the weld base. The present invention, as will appear more fully hereinafter, is directed to a method of and apparatus for preventing this undesirable condition.

The device D comprises an outer cylindrical member 10 adapted to rest upon the work, and an inner cylindrical member 12 which acts as a support for a welding rod guiding means. Means, such as an annular plate 14 is secured to the outer member 10 at a point spaced above the work and has a central aperture 16 in which the inner cylindrical member 12 may be secured, as by welding or otherwise. Welding material delivery means are provided, and as shown, this means comprises an inverted truncated conical hopper 18 which extends between the aperture 16 and the upper end of member 10. The larger end of the hopper 18 is attached to the upper end of the member 10 and its smaller end is secured to the plate 14 and the member 12 adjacent the aperture 16. The wall of the inner member 12 has several cut-away portions 20 which are preferably made in such a manner that some uncut metal remains at the top and bottom of the inner member 12, forming rings 22 and 24 which act as structural supports. The portion 26 of the wall of member 10 below plate 14 and in engagement with the work constitutes means supporting the welding material delivery means in spaced relation to the work to provide for free flow of the slag S laterally or radially away from the electrode E.

In rivet welding with the present invention, the device D is placed upon the work so that it is substantially centered over the aperture C. The welding rod or electrode E, preferably of bare or uncoated metal, is advanced toward the work along the center line of the feeding device D, and the granular material G is fed into the hopper 18 and flows through the cut-away portions 20 of the inner member 12 to the welding region around the electrode. As the welding operation proceeds, the welding material in the welding zone becomes molten due to the passage of a relatively heavy electric current from the fusing end of the electrode E through the material to the work. This molten slag is prevented from building up around the electrode and is caused to flow laterally or radially away from the electrode along the top of the work by the horizontally stationary supported column of new granular material continuously fed to the welding zone and supported on the welding puddle by the feeding device D.

Figure 3:
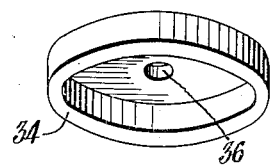
Figs. 3 and 4 are perspective views of electrode guiding means which may be used with the device of Fig. 1.
Figure 4:
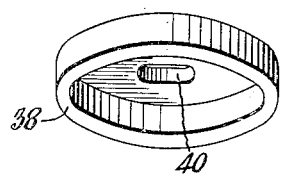

If desired, guiding means made of a suitable non-conductor of electricity, as shown in Figs. 3 and 4, may be attached to the top of the inner member 12 to guide the welding electrode to the work. As shown in Fig. 3, this means may comprise a disc 34 formed with a circular hole 36 which acts as a centering guide for the welding electrode E. If desired, the means shown in Fig. 4 may be used, which means comprises a disc 38 formed with an elongated aperture 40, so that the electrode may be manipulated laterally of the welding region or puddle. The use of the disc 38 is particularly advisable when the rivet welds are of larger size.

Figure 5:
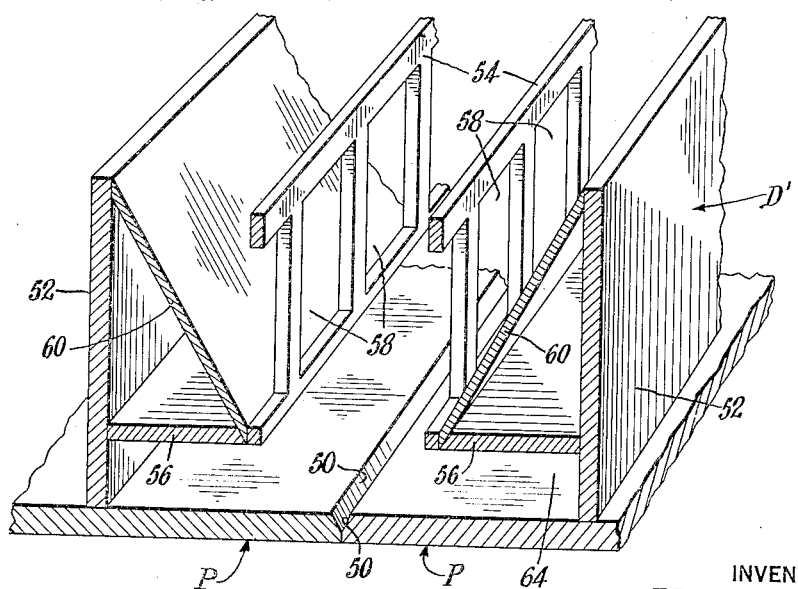
Fig. 5 is a perspective view of a lineal welding device embodying the principles of the invention.

Fig. 5 illustrates the application of the principles of the invention to the formation of lineal or seam welds. In this embodiment of the invention, plates P, P are arranged with their adjacent bevelled edges 50 in abutment to form a welding groove or V. The welding apparatus in this instance comprises a generally rectangular device D', including an outer pair of horizontally spaced and parallel vertical members 52 corresponding to the member 10 of Fig. 1 and an inner pair of horizontally spaced and parallel vertical members 54 corresponding to the member 12 of Fig. 1. An inwardly extending horizontal plate 56 is secured to each member 52 at a point above its lower end and extends toward the center of the device. The inner members 54 are each secured longitudinally of the inner end of one of the horizontal plates 56, and are formed with cut-away portions 58 similar to the cut-away portions 20 of the device shown in Figs. 1 and 2. A sloping plate 60 is secured to the upper end of each member 52, and at its lower end, each plate is secured to one of the members 54 and one of the plates 56. Plates 60 correspond to the hopper 18 of Fig. 1. If desired, a longitudinally slotted horizontal plate, corresponding to discs 34 and 38, may be secured to the upper ends of the members 54 to guide the welding electrode along the welding groove or V between the plates P, P. As the function and operation of this embodiment of the invention are identical with that of the embodiment shown in Figs. 1 and 2, description of the operation is believed unnecessary.

In both embodiments of the invention, a space 62 (Fig. 1) or 64 (Fig. 5) is provided between the work and the lower inside portion of the devices D or D' which permits the molten slag S to flow transversely of the welding zone under the pressure of the horizontally stationary supported column of welding material. The molten slag heats the plate areas adjacent the welding zone and thereby improves the economy of the welding operation. This movement of the molten slag is accomplished by the continual feeding of new welding material from the device D or D' to the region of the weld. This supported column of welding material displaces the molten slag S and thereby prevents an accumulation thereof around the lower end of the electrode. The slag is thereby prevented from overheating the electrode.

While certain embodiments of the invention have been illustrated and described in some detail, it will be obvious to those skilled in the art that the invention may be otherwise embodied and that the relative dimensions and interrelation of parts may be changed within the scope of the appended claims.

What is claimed is:

1. A method of electric rivet welding which comprises depositing a granular fusible mineral welding material upon a limited, substantially fixed area of the work; inserting the end of a fusible welding electrode into said material; passing an electric current from the end of said electrode through said material to such limited, substantially fixed area of the work; and maintaining during the entire welding operation, above the welding puddle and surrounding said electrode, a horizontally stationary column of said welding material of a height sufficient to counteract substantially a rise of molten material along said electrode and overheating of successive portions of said electrode before they reach the welding region.

2. A method of electric rivet welding which comprises depositing a granular fusible mineral welding material upon a limited, substantially fixed area of the work; inserting the end of a fusible welding electrode into said material; passing an electric current from the end of said electrode through said material to such limited, substantially fixed area of the work; and continuously feeding a new supply of said material to such limited, substantially fixed area of the work as said material is fused by said electric current to maintain, during the entire welding operation, a horizontally stationary column of said welding material above such limited area and surrounding said electrode.

3. Welding apparatus comprising, in combination, a cylindrical member adapted to be supported on the work; a centrally apertured annular plate secured to said member above its lower end; and a conical hopper extending between the aperture in said plate and the upper edge of said member.

4. In the combination claimed in claim 3, apertured welding electrode guiding means supported on said plate in alignment with the aperture therein.

5. Welding apparatus comprising, in combination, a cylindrical member adapted to rest on the work to be welded; an inverted conical hopper having its larger end secured to the upper end of said member and its smaller end disposed in spaced relation to the work; and means securing the smaller end of said hopper to said member.

6. Welding apparatus comprising, in combination, an outer cylindrical member adapted to rest upon the work; an annular plate secured to said outer cylindrical member at a point spaced above the work; an inner cylindrical member secured to said annular plate; and welding rod guiding means attached to the top of said inner cylindrical member.

7. Welding apparatus as claimed in claim 6, including an inverted conical hopper having its larger end attached to the upper end of said outer cylindrical member and its smaller end attached to the lower end of said inner cylindrical member and to said annular plate.

8. Welding apparatus as claimed in claim 6, in which said inner cylindrical member is formed with cutaway portions in such a manner that uncut metal remains at the top and bottom of said inner cylindrical member forming rings acting as structural supports.

EDWARD D. MORRIS.